(12) United States Patent
Weber et al.

(10) Patent No.: US 10,019,445 B2
(45) Date of Patent: Jul. 10, 2018

(54) SLIDESHOWS COMPRISING VARIOUS FORMS OF MEDIA

(71) Applicant: Apple Inc., Cupertino, CA (US)

(72) Inventors: Ralf Weber, San Jose, CA (US); Guillaume Vergnaud, Tokyo (JP)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/870,632

(22) Filed: Sep. 30, 2015

(65) Prior Publication Data

US 2016/0021331 A1   Jan. 21, 2016

Related U.S. Application Data

(63) Continuation of application No. 12/217,302, filed on Jul. 2, 2008, now Pat. No. 9,158,776.

(60) Provisional application No. 60/954,285, filed on Aug. 6, 2007.

(51) Int. Cl.
| | |
|---|---|
| *G06F 17/30* | (2006.01) |
| *G11B 23/40* | (2006.01) |
| *G11B 27/034* | (2006.01) |
| *G11B 27/34* | (2006.01) |
| *H04N 5/85* | (2006.01) |
| *H04N 5/91* | (2006.01) |

(Continued)

(52) U.S. Cl.
CPC ........ *G06F 17/30056* (2013.01); *G11B 23/40* (2013.01); *G11B 27/034* (2013.01); *G11B 27/34* (2013.01); *H04N 5/85* (2013.01); *H04N 5/91* (2013.01); *G11B 2220/2562* (2013.01); *H04N 5/765* (2013.01); *H04N 5/781* (2013.01)

(58) Field of Classification Search
CPC ......... G06F 17/30056; G06F 17/30017; G11B 23/40
See application file for complete search history.

(56) References Cited

U.S. PATENT DOCUMENTS

| | | | |
|---|---|---|---|
| 6,122,436 A | 9/2000 | Okada et al. | |
| 6,683,649 B1 * | 1/2004 | Anderson | .......... H04N 1/00161 348/231.4 |
| 9,158,776 B2 | 10/2015 | Weber et al. | |

(Continued)

FOREIGN PATENT DOCUMENTS

WO   WO 2007072467 A1 *   6/2007   ........... G11B 27/031

OTHER PUBLICATIONS

Bounds et al. "Windows Movie Maker 2: Zero to Hero," Apress 2003.*

(Continued)

*Primary Examiner* — Robert B Leung
(74) *Attorney, Agent, or Firm* — Invoke (57) ABSTRACT

Methods and apparatus are provided providing users with the ability to create and produce multimedia devices. In one aspect of the present invention, users are provided with the capability to easily and seamlessly create slideshows using multiple forms of graphic elements instead of just still pictures. In another aspect of the present invention, users are provided with the capability to create and modify the DVD menu that is required for DVDs to function properly on conventional DVD players. In still another aspect of the present invention, users are provided with an intuitive graphic interface that simply and clearly explains the trade offs the user must make in deciding which mode to record the DVD.

19 Claims, 9 Drawing Sheets

(51) Int. Cl.
*H04N 5/765* (2006.01)
*H04N 5/781* (2006.01)

(56) References Cited

U.S. PATENT DOCUMENTS

| | | | | |
|---|---|---|---|---|
| 2002/0118949 | A1* | 8/2002 | Jones | G11B 23/40 386/241 |
| 2004/0095379 | A1* | 5/2004 | Chang | G06Q 10/10 715/727 |
| 2004/0114904 | A1* | 6/2004 | Sun | G06F 17/30056 386/278 |
| 2004/0184310 | A1 | 9/2004 | Seo et al. | |
| 2004/0205479 | A1* | 10/2004 | Seaman | G06F 17/30056 715/202 |
| 2006/0277217 | A1* | 12/2006 | Lehikoinen | G06F 17/30044 |
| 2007/0006063 | A1 | 1/2007 | Jewsbury et al. | |
| 2007/0118801 | A1* | 5/2007 | Harshbarger | G11B 27/031 715/730 |
| 2009/0041423 | A1 | 2/2009 | Weber et al. | |

OTHER PUBLICATIONS

"U.S. Appl. No. 12/217,302, Appeal Brief dated Apr. 16, 2012", 21 pgs.
"U.S. Appl. No. 12/217,302, Reply Brief dated Aug. 14, 2012", 6 pgs.
"U.S. Appl. No. 12/217,302, Response dated Sep. 1, 2011 to Non Final Office Action dated Jun. 21, 2011", 14 pgs.
"U.S. Appl. No. 12/217,302, Response dated Dec. 22, 2011 to Final Office Action dated Oct. 31, 2011", 15 pgs.
"CD & DVD PictureShow 4, User Guide", Ulead, Ulead Systems, Inc., (May 2005).
"Introduction to Windows Movie Maker 2", University of Texas, School of Information, Summer 2005, Accessed Oct. 26, 2011, [Online]. Retrieved from the Internet: <http://www. ischool.utexas. edu/tech nology/tutorials/g raph ics/moviemaker2/M M2handout. pdf>.
"Windows Movie Maker", Teaching Matters, Inc., Digital Documentaries, [Online] retrieved from the internet: <[http://www. teachingmatters.org/digidocs/resources. htm]>under'MovieMakerManual' on May 21, 2015., (2004).
Ralf, Weber, et al., "Concurrently Displaying a Drop Zone Editor with a Menu Editor During the Creation of a Multimedia Device", U.S. Appl. No. 12/217,337, dated Jul. 2, 2008.
Weber, Ralf, et al., "User Interface That Conveys the Predicted Quality of a Multimedia Device Prior to Its Creation", U.S. Appl. No. 12/217,303, filed Jul. 2, 2008, 59 pgs.
"U.S. Appl. No. 12/217,302, Advisory Action dated Jan. 11, 2012", 3 pgs.
"U.S. Appl. No. 12/217,302, Appeal Brief filed Apr. 16, 2012", 21 pgs.
"U.S. Appl. No. 12/217,302, Appeal Decision dated Mar. 2, 2015", 8 pgs.
"U.S. Appl. No. 12/217,302, Examiner Interview Summary dated Sep. 15, 2011", 3 pgs.
"U.S. Appl. No. 12/217,302, Examiner's Answer to Appeal Brief dated Jun. 20, 2012", 15 pgs.
"U.S. Appl. No. 12/217,302, Final Office Action dated Oct. 31, 2011", 15 pgs.
"U.S. Appl. No. 12/217,302, Non Final Office Action dated Jun. 21, 2011", 11 pgs.
"U.S. Appl. No. 12/217,302, Notice of Allowance dated Jun. 9, 2015", 10 pgs.
"U.S. Appl. No. 12/217,302, Reply Brief filed Aug. 14, 2012", 6 pgs.
"U.S. Appl. No. 12/217,302, Response filed Sep. 1, 2011 to Non Final Office Action dated Jun. 21, 2011", 14 pgs.
"U.S. Appl. No. 12/217,302, Response filed Dec. 22, 2011 to Final Office Action dated Oct. 31, 2011", 15 pgs.
"CD & DVD PictureShow 4, Features & Benefits", ULEAD, Ulead Systems, Inc., (2005).
"CD & DCD PictureShow 4, User Guide", ULEAD, Ulead Systems, Inc., (May 2005).
"Introduction to Windows Movie Maker 2", University of Texas, School of Information, Summer 2005, Accessed Oct. 26, 2011, [Online]. Retrieved from the Internet: <http://www. ischool.utexas. edu/technology/tutorials/g raph ics/moviemaker2/MM2handout. pdf>.
"Windows Movie Maker", Teaching Matters, Inc., Digital Documentaries, [Online] retrieved from the internet: <[http://www. teachingmatters.org/digidocs/resources. htm]>under'MovieMakerManuar'on May 21, 2015., (2004).
Buechler, "Microsoft Windows Movie Maker 2: Do Amazing Things, 2004", Microsoft Press, pp. 5, 7, 9, 19-21, 41, 47, 97-103,112-115, 158-160.
Ralf, Weber, et al., "Concurrently Displaying a Drop Zone Editor with a Menu Editor During the Creation of a Multimedia Device", U.S. Appl. No. 12/217,337, filed Jul. 2, 2008.
Weber, Ralf, et al., "User Interface That Conveys the Predicted Quality of a Multimedia Device Prior to Its Creation", U.S. Appl. No. 12/217,303, filed on Jul. 2, 2008, 59 pgs.

* cited by examiner

SLIDESHOWS COMPRISING VARIOUS FORMS OF MEDIA

CROSS REFERENCE TO RELATED APPLICATION

This application is a continuation of and claims the benefit of priority to U.S. patent application Ser. No. 12/217,302 filed Jul. 2, 2008, which claims the benefit of priority to U.S. Provisional Patent Application No. 60/954,285, filed Aug. 6, 2007, the benefit of priority of each of which is claimed hereby, and each of which are incorporated by reference herein in its entirety.

BACKGROUND OF THE INVENTION

This relates to multimedia devices and more particularly to methods and apparatus for enabling and aiding individual users in the creation of multimedia devices such as DVDs.

Multimedia devices such as CDs and DVDs are widely known and used. In commercial applications, a vendor prepares the content that ultimately goes on the multimedia device, such as a series of songs or a movie, and mass produces duplicates of a master disc which are packaged, distributed and sold in the normal stream of commerce.

Advances in computer technology, however, have made it possible to provide individual consumers with the ability to create CDs and DVDs in their home, through a process commonly referred to as "burning" (in which a blank piece of media is recorded). In some instances, burning is limited to a single instance for each physical piece of media, while in other instances, the media may be written more than once. For example, with a DVD-R type burnable DVD, a user may place a series of home videos on the DVD and burn it, but could not, at a later time, add anything else to the DVD. A DVD-RW, on the other hand, may be burned multiple times, such that additional data may be added to the DVD after the initial burning.

One difference between types of media, such as CDs and DVDs, is that DVDs are often expected to automatically work, when inserted into a DVD player. In that manner, the information from the DVD should load into the processor within the DVD player, and the user should be provided with some form of user interface with which to make viewing selections. For example, when a commercial movie DVD is placed into a DVD player, a top menu is provided to the user with options such as "Play Movie," "Sound Settings," "Video Settings," "The Making of XYZ," etc.

Enabling a consumer to easily create a similar experience for a user with a home-burned DVD, however, is a difficult process. There are many different ways that the various steps in the process of creating a DVD can be accomplished. In addition, at most or all of these steps, the consumer must make choices that can affect the quality of the recording, the time it takes to make the recording, and the amount of information that can be burned on to the DVD. In many instances, the positive effect of one decision will cause a negative effect of another, conveying the effects of such choices, in a simple manner, is difficult at best. For example, if a use wants to burn the DVD as quickly as possible, the resulting quality of the recorded material may suffer.

Similarly, commercial production of DVDs usually entails the work of people who are experts at dealing with graphic images. For example, a DVD of a typical commercial movie may include a portion of the DVD menu in which one or more small clips of the film are running continuously, or that still images of the movie are displayed as a background on the main menu. Providing consumers with similar capability, however, becomes a difficult task, as many consumers are limited in their knowledge and expertise of manipulating graphic images, etc. In many instances, consumers utilize a single, limited size, display as a workspace. As such, it can become increasingly difficult to manipulate a library of still images, another library of movies/clips, while at the same time interacting with the software that is required to create the DVD itself.

In addition, while commercial DVDs are often limited to movies and related material, many consumers often desire to create, for example, slideshows of the photos they have taken, such as on a vacation, and to place those slideshows on a DVD which other family members or friends can view in the convenience of their own living room. As technology has become more prevalent in society, however, it has become more common that vacations, etc., are often captured as a combination of moving and still images. In some instances, one family member may use a video camera to record certain parts of the vacation, while another individual takes pictures. In other instances, the digital camera may include the capability to record both pictures and movies, albeit at different times.

When the time comes to document the trip or vacation, consumers are often left with a choice of creating a series of videos or a slideshow of pictures. In some part, this is often because they are substantially different media that are handled in different ways.

Digital pictures, for example, are fixed files in which an image is stored in accordance with a predetermined method. For example, the most common form of storage for digital pictures is the JPEG format, a well-known industry standard that relates to image compression. Video files, on the other hand, involve more complex file structures that are often stored using any one of a variety of standards, such as the Quicktime, MPEG and AVI formats. Consumers that are essentially given a choice between one format or the other are left frustrated when various portions of their event are omitted from the final product.

Accordingly, what is needed are methods and apparatus for providing users with the ability to easily and simply create multimedia devices, such as DVDs. It would be advantageous if the tools to create these devices could provide the consumer with enough information so that the user could make informed decisions in the tradeoffs that are often experienced. In addition, what is needed are methods and apparatus for providing the user with the ability to simply and easily add information, such as digital images and movies or film clips, to the menu portion of the DVD interface, so that the user can customize each aspect of his or her creation. Another aspect of DVD creation that is needed, is to provide the creative users with the ability to intermix different forms of media in a single slideshow presentation. In that manner, the creative person would be able to document events in the chronological order in which the images, movies, etc. were captured.

SUMMARY OF THE INVENTION

Methods and apparatus are provided for providing users with simple and informative ways to create multimedia devices, such as DVDs. These methods and apparatus include various aspects of the creative process, as well as the burning process which is used to create the actual DVD device.

In one embodiment, the methods and apparatus of the present invention provide the user with the ability to make one or more selections prior to burning a media device. Those choices can include a preference for burning performance (or, "how long will it take to actually burn the CD or DVD"), capacity (or "how much stuff can I stuff on to this piece of media"), quality (or "how can I get the best looking images and movies to appear on the burned media"), or other factors. In addition to providing the user with various options, the methods and apparatus of the present invention also provide the user, including novice users, with quick and simple indications of the consequences of theses decisions.

In accordance with another aspect of the present invention, the method and apparatus provide users with the ability to quickly and easily include any number of forms of media on to the menu portion of the media device that is being burned. In the instance of a DVD, these methods and apparatus give the user the ability to add still pictures, slideshows and/or movies and film clips to the menu that a viewer sees when the DVD is inserted into a DVD player that has been turned on. The capability to make these additions is provided in a manner such that the user can still view the main subject matter being produced, such that context is not misplaced during the creative process.

In accordance with the principles of another aspect of the present invention, method and apparatus are provided which enable a user to create slideshows in which multiple forms of media can be intermixed repeatedly, such that the slideshow can be created in, for example, a chronological format regardless of the media used to capture various portions of the event.

The methods and apparatus of the present invention provides users, including relative novices, with the capability to produce and create robust multimedia presentations which can then, using other aspects of the present invention, be burned on to conventional media devices, such as DVDs. The final products resulting from these processes can have the look, feel and operation of a commercial product, even though it can be been produced entirely on a home computer.

Each of these aspects of the present invention can be provided to users on an individual basis, or as part of an integrated package for the creation and production of multimedia devices, such as DVDs. The techniques of the present invention can provide users with an almost seamless experience in the creation of multimedia devices. Various forms of media, such as digital pictures, digital movies and integrated slideshows, are presented to the user for inclusion in the final product at the same time as the user is editing the content itself, without interfering with the editing process.

BRIEF DESCRIPTION OF THE DRAWINGS

The above and other features of the present invention, its nature and various advantages will become more apparent upon consideration of the following detailed description, taken in conjunction with the accompanying drawings, in which like reference characters refer to like parts throughout, and in which.

DETAILED DESCRIPTION OF THE INVENTION

Figure 1:
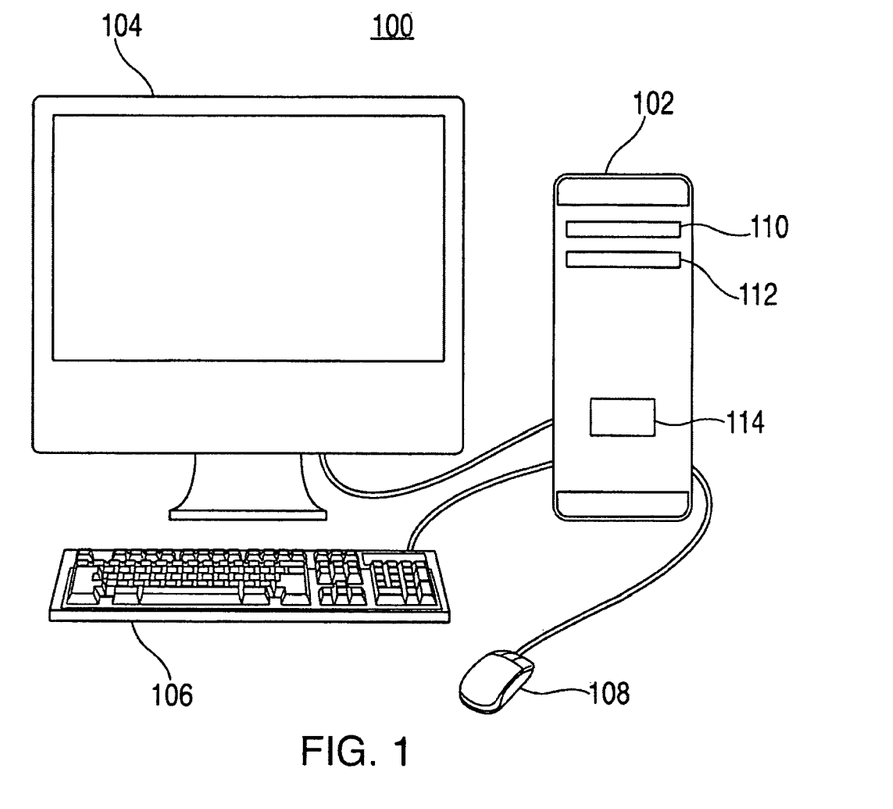
FIG. 1 is a schematic diagram of a computer system which operates in accordance with the principles of the present invention.

FIG. 1 shows a schematic diagram of a computer system 100, which can be operated in accordance with the principles of the present invention. Computer system 100 may include processor box 102, monitor 104, keyboard 106 and mouse 108. Processor box 102 may include various components, such as those described below with respect to FIG. 2, as well as optical drive 110 and optional optical drive 112. In addition, external drives, such as FLASH sticks or other such devices, may be connected to processor box 102 via one or more ports that are located, in this instance, on a section 114 of the front panel of processor box 102. As set forth in detail below, computer system 100 may be operated in accordance with the principles of the present invention in order to create and produce multimedia devices, such as DVDs, which can then be played on conventional DVD players.

Figure 2:
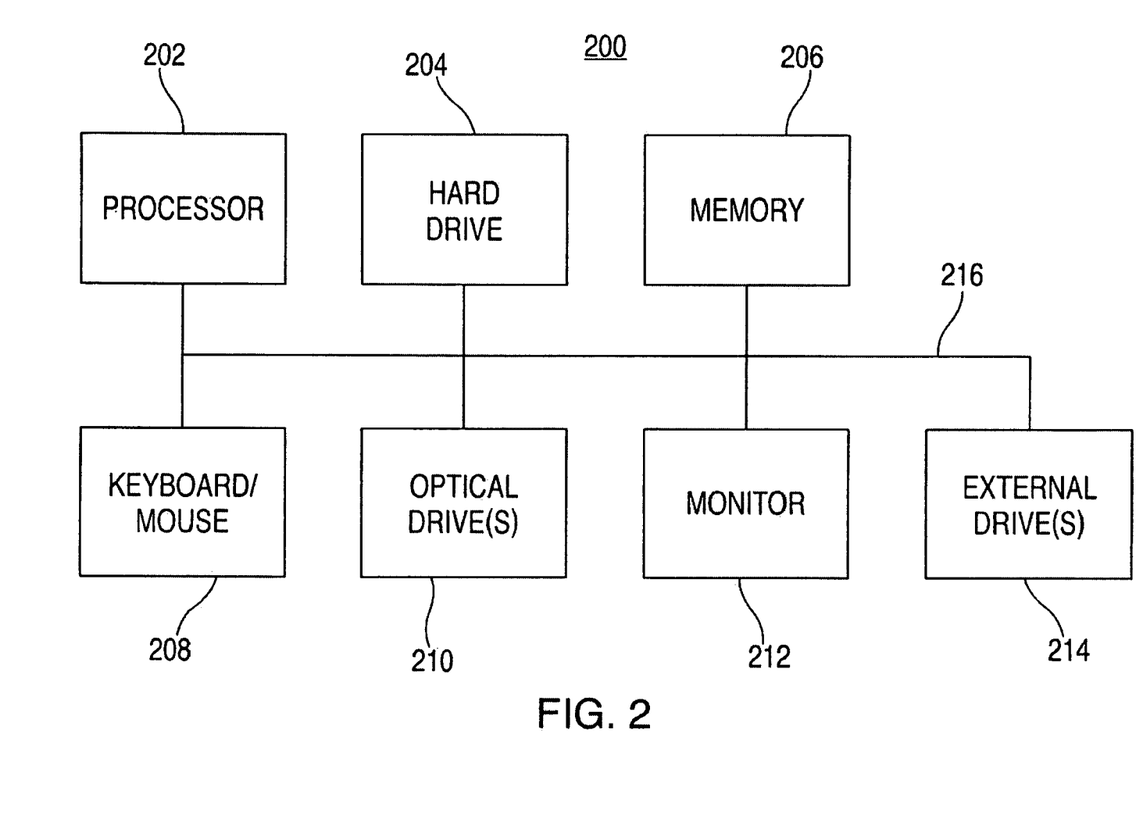
FIG. 2 is a schematic diagram of a computer system which operates in accordance with the principles of the present invention.

FIG. 2 shows computer system 200, which can be a further representation of computer system 100 of FIG. 1. Computer system 200 may include processor 202, hard drive 204, memory 206, keyboard/mouse 208, optical drive(s) 210, monitor 212 and external drive(s) 214. For purposes of illustration, each of the components shown in FIG. 2 is shown connected together to a single bus 216. Persons of ordinary skill in the art will appreciate that, for all practical purposes, computers are currently designed with multiple buses that are interfaced with each other. For example, keyboard/mouse 208 is typically connected to the computer via a USB connection (i.e., universal serial bus), while the processor and memory communicate via a separate, high-speed bus. Computer system may be operated in accordance with the principles of the present invention in order to assist a user in the creation and production of multimedia devices, such as DVDs, which would eventually be burned on optical drive 210.

Computer systems 100 and 200, in general, are widely known. When computer systems first became available, users could only store information on floppy disks, which typically stored less than 1 MB of information. Eventually, optical drives began to appear in computers, first in the form of CD drives, and then in the form of combo drives that could read CDs and DVDs. At that time, CD and DVD burners were very expensive devices that rarely, if ever, appeared in home or office computers. Then that technology matured as well, and CD, DVD and combo burners became widely available.

As soon as optical drive burners began to experience widespread use, a need for methods and apparatus to simplify their use arose. In general, burning information to a CD is a relatively simple process because the devices that play CDs don't require additional information. For example, CDs that are burned on a computer can, in general, be played on a conventional CD player or they can be played on a computer. When playing music, the CD starts at track 1 and the user can simply advance forward and backward in an effort to find a desired song.

The process of creating DVDs, on the other hand, can be more complex. If a DVD is burned as a DVD-ROM, the process is basically the same as burning a CD, in that the various files that are intended to be written on to the DVD-ROM are written, and then those files can be accessed from the desktop once the burned DVD-ROM is placed back in to the optical drive on the computer and read. Burning a DVD as a DVD-ROM will not, however, enable a user to play that DVD on a conventional DVD player. That requires special formatting and other provisions. For example, one cannot simply take a slideshow that was created on a computer, copy it to a blank DVD, burn DVD and expect it to play on a conventional DVD player (the same problem exists in trying to place movies on to a DVD instead of a slideshow).

In addition to the general formatting problems that users can experience, it has also become increasingly difficult to create slideshows that satisfy the needs of users because conventional slideshows are typically limited to a series of still photographs, to which an audio track may be added (e.g., as background music). Traditionally, slideshows were created from a series of pictures because that was how events were captured using digital or film cameras. More recently, however, users have been capturing memories of their events using other forms of media, such as digital video. For example, during a family trip to a local zoo, the majority of events during the day may be captured as pictures using a digital camera. However, they may be certain events, such as feeding times for the sea lions and the elephants, which are captured using a digital movie camera instead.

Figure 3:
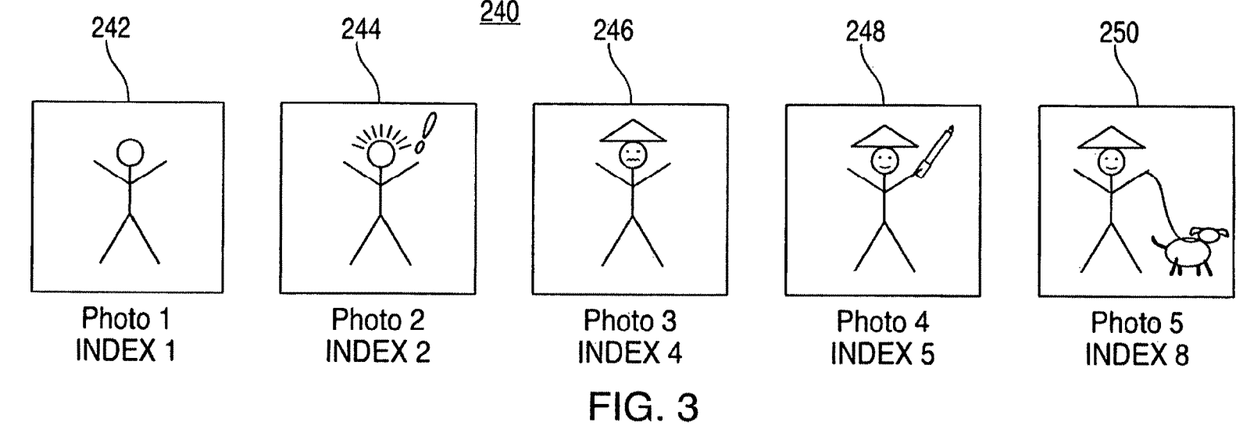
FIG. 3 is a schematic diagram of a conventional slideshow.

If the user utilizes conventional methods to create a slideshow, the resulting slideshow will be similar to that shown as slide show 240 in FIG. 3. Slideshow 240 includes a series of five still photographs 242, 244, 246, 248 and 250. As is apparent from the legends under the photographs, however, this conventional slideshow does not tell the whole story. In this instance, even though pictures 1-5 are shown in order (i.e., "Photo 1, Photo 2, etc.), the second, "Index" label shows that there are three missing pieces (i.e., index elements 3, 6 and 7). Those pieces were video segments that were shot in between the various times when photographs were being taken.

Figure 4:
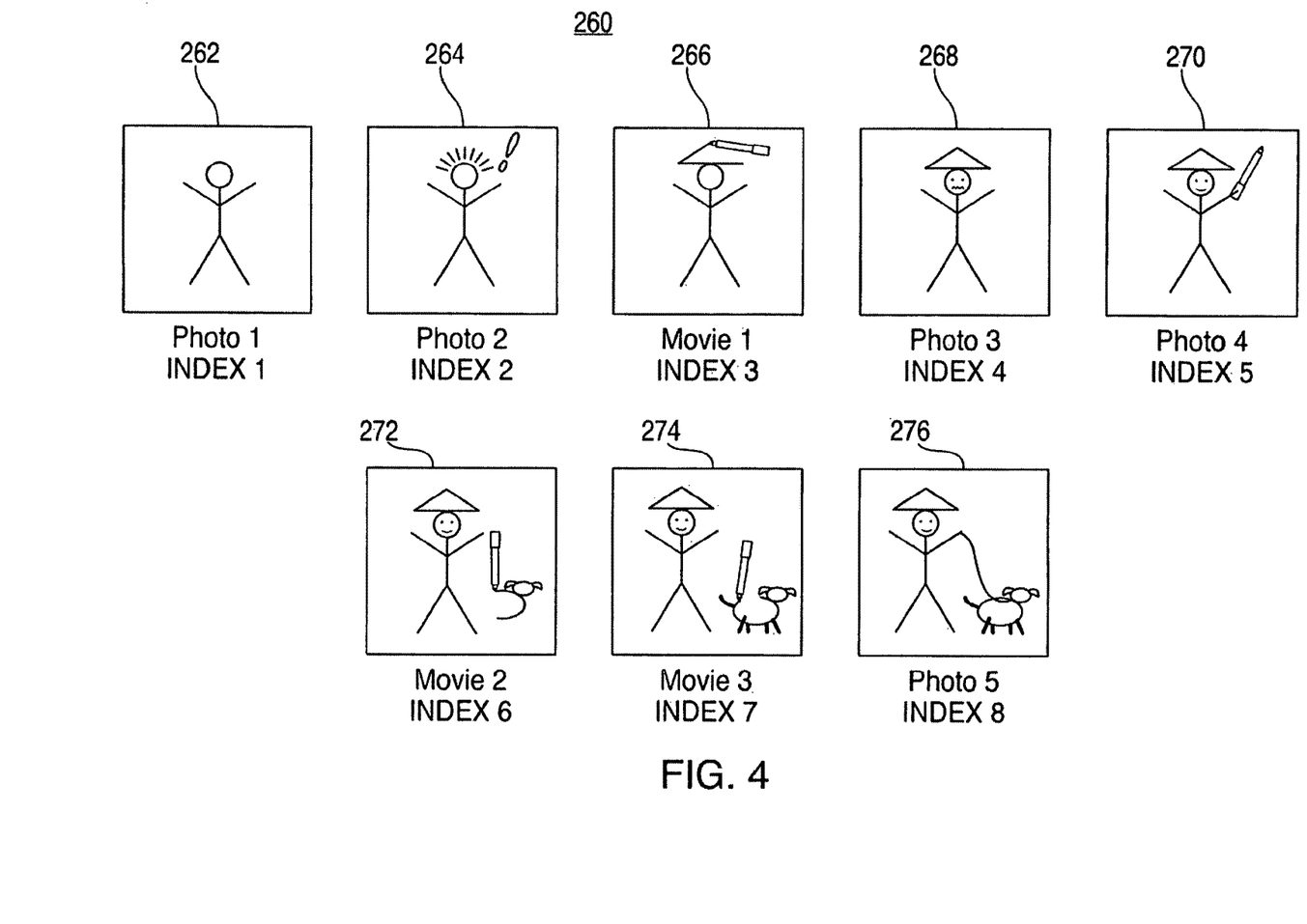
FIG. 4 is a schematic drawing of a slideshow created and produced in accordance with the principles of the present invention.

FIG. 4 shows a slideshow 260 created and produced in accordance with the principles of the present invention in which multiple forms of media are integrated together in a single slide show. Slideshow 260 includes still photographs 262, 264, 268, 270 and 276, as well as movies or movie clips 266, 272 and 274. As can be seen in FIG. 4, movie clip 262 occurred between the time photographs 2 and 3 were taken. Similarly, movie clips 272 and 274 occurred sequentially with respect to each other, between when photographs 270 and 276 were taken. Once all of the photographs and videos have been placed in the proper order within slideshow 260, a complete picture of the captured event unfolds. One skilled in the art would also appreciate that other forms of data files (e.g., word processing documents, spreadsheets, address book entries, calendar entries, etc.), which are collectively referred to herein as text files, could also be incorporated into a single multimedia slide show.

Figure 5:
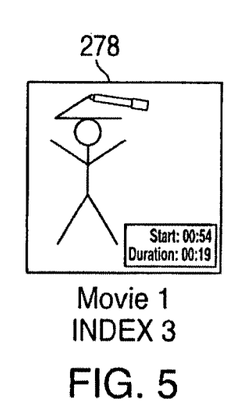
FIG. 5 is a schematic diagram of one of one portion of the slideshow of FIG. 4 which operates in accordance with the principles of the present invention.

One of the difficulties in combining different forms of media in a single slideshow, however, if the simple fact that they are different. Photographs are single moment, still images that are displayed as part of a slideshow for a given period of time (i.e., they have no intrinsic duration and are therefore, user-defined). Videos, on the other hand, have an intrinsic duration which extends the length of the recording. In order to assist the user in deciding how long the user-defined period should be for transitioning from still images, the user can be provided with sequence information about the movie clips, such as the start time and duration, as is shown by element 278 in FIG. 5 (i.e., a start time of 34 seconds, and a duration of 19 seconds).

Moreover, if the different forms of media are to be truly integrated, there should be a seamless transition back and forth between different forms of media. This seamless transition should be accounted for by the system so that users can simply select the media elements and the sequence of those elements and, in accordance with the principles of the present invention, the system does the rest. No additional editing steps or alignment of the media should be required. Thus, the system should therefore provide transitions and fades between each element, regardless of whether the form of media varies from element to element.

Figure 6:
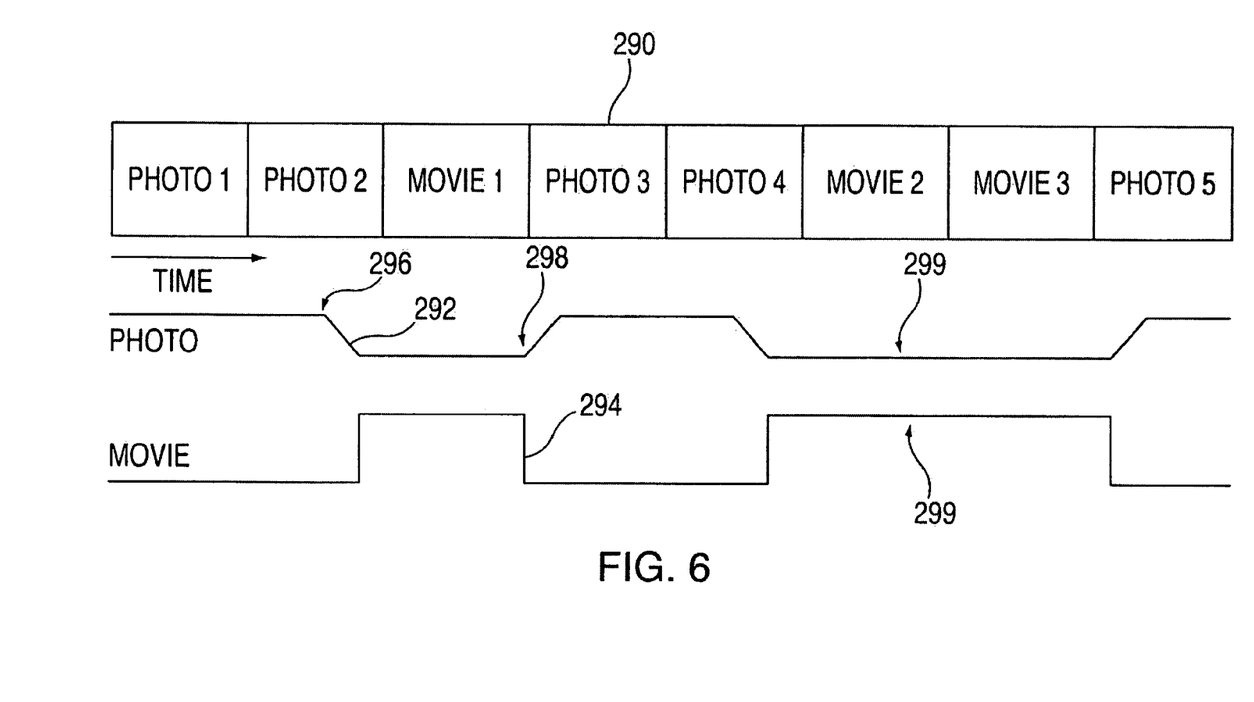
FIG. 6 is a schematic diagram that shows sound tracks as they relate to elements in the slideshow of FIG. 4, which are created and produced in accordance with the principles the present invention.

An additional consideration that must be accounted for by methods and apparatus for creating and producing multimedia devices in accordance with the principles of the present invention relates to the audio tracks that accompany the slideshow. FIG. 6 shows one example of how audio issued can be addressed when different forms of media are used in a single slideshow. Slideshow track 290 includes a series of photographs and videos in time sequence going from left to right. FIG. 6 also includes audio track 292 which accompanies the photographs, and audio track 294 which accompanies the movies in the slideshow.

As the photographs were still images with no duration, there was not any audio track recorded at the time the pictures were taken. In many instances, the user selects background music to play while the photographs are being displayed. The video clips, however, are typically recorded simultaneously with the audio. The system, in accordance with the principles of the present invention, will cause the photograph audio track to fade out (or "duck") starting at a predetermined amount of time prior to the beginning of the movie clip. For example, in FIG. 6, the photo audio track begins to fade out to zero at time 296 and does not begin ramping back up to normal volume until time 298, when the movie clip has ended.

In addition, it would be preferred for the system to monitor the audio track of the movie clips in advance so that, in the event that a movie clip has no audio signal, the photo audio track would not duck out. It may also be possible to provide the user with the ability to mute some or all of the audio files for the movie tracks if, for example, the slideshow is to play continuous in the background of a party or event and the audio from the movie clips could potentially be distracting. In the event that two movie segments occur sequentially, it is preferred that the photo audio track remain muted, and that the movie audio track simply goes from one movie clip directly to the next.

With regard to the overall playback of the slideshow, the user may, in accordance with the principles of the present invention, be given the option to fit the transitions between photographs and movie clips to a given length of an audio clip. In that instance, the duration of time for each movie clip gets priority, and the remaining time may be divided amongst the photographs. If, for example, the length of the audio track is not long enough to account for all of the images, it may be preferred to calculate the time for various passes through the complete audio track in order to determine how long to allot for transitions such that the display of images still ends when the audio track ends (such that the audio track may play 2 or 3 complete times in order to account for all of the images/movie clips).

From an implementation perspective, in accordance with the principles of the present invention, only the actually used portions of the video are rendered, and the same objects that are typically utilized with photograph slideshows, such as the forward and backward arrows, title, comments, etc., are laid over the movie clips. In addition, because only a single sound track may exist on a DVD at a time, the soundtrack of the slideshow, including all of the fades in and out, needs to be mixed with the audio portions of all of the movie segments prior to burning. The movie segments can therefore be treated just like photographs are normally treated in a slideshow, such that chapter markers and the like can also be used.

Figure 7:
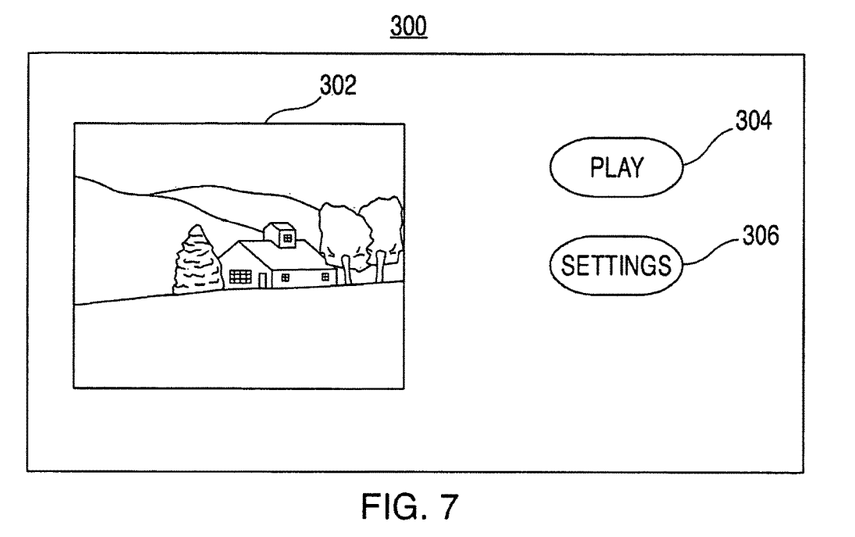
FIG. 7 is a schematic diagram of a conventional system used to edit a menu screen on a DVD creation program.

Another part of creating multimedia devices that is addressed by the methods and apparatus of the present invention relates to the menu templates required for DVDs to operate on conventional DVD players. DVD menus typically serve multiple purposes. In the first instance, the DVD menu is functional, in that it provides the viewers with the "buttons" necessary to control the playback of the DVD. For example, FIG. 7 shows a sample edit window 300 that may be displayed on monitor 104 when a user is creating a DVD menu. As shown in FIG. 7, edit window 300 can include one or more graphic elements 302 and one or more functional buttons 304 and 306. In this instance, functional button 304 is "PLAY" which a viewer would select to start viewing the programming. Once the slide show is playing, the user may pause, fast forward, rewind, or otherwise interact with the slide show in the normal manner that slide shows and DVD movies can be interacted with.

Functional button 306 refers to "SETTINGS" which a viewer may use to try and adjust the manner in which the programming is displayed, such as by selecting a specific scene to begin playback instead of the beginning, repeatedly loop the slide show (or a portion thereof), cause the "slides" of the slide show to be displayed randomly, etc.

One other purpose for the menu screen is to provide the viewer with some form of introduction into the material on the DVD. For example, graphic element 302 can be a simple digital still picture, a series of still pictures in the form of a slideshow that plays continuously, a movie clip that loops continuously, or various other things. The selection of what goes into the graphic is a design choice of the individual creating the DVD, and is typically used to give the DVD a very individual look and feel. The location of the graphic element(s) may be totally customized, in the case of experienced users, or may simply be one or more locations set forth in templates that users with little to no experience can utilize to create DVD menu pages. When templates are utilized, the area where the graphic element(s) goes is sometimes referred to as a "drop zone" (in that the user drags and drops the graphic element into place).

Figure 8:
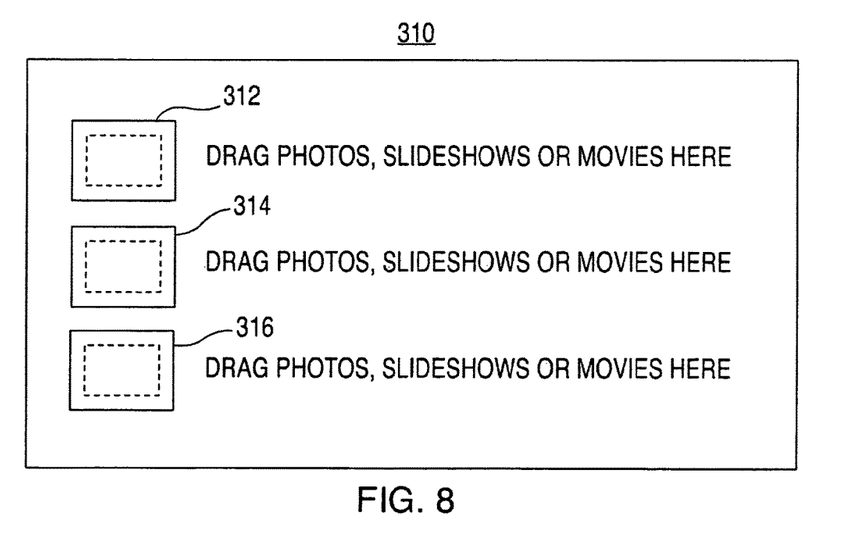
FIG. 8 is a schematic diagram of a conventional method and apparatus that can be used to place various forms of media on a menu screen using a DVD creation program.

Previous attempts at providing the user with drop zone capability have been limited. For example, in one instance, if a user was editing the DVD menu in window 300 and desired to create or change the drop element, the user was taken to an entirely different screen, such as drop zone screen 310 shown in FIG. 8. Drop zone screen 310 can include one or more drop zones 312, 314 and 316, as regions where a user can drag and drop a graphic element that will eventually make its way back on to the menu page. Thus, in this instance, the user will have to exit the drop zone editor and return to the menu editor to see the effects of the changes made on the drop zone page. One other negative effect of this option is that there is no easy correlation for the user to make between the different drop zones 312, 314 and 316 and, for example, graphic element 302 on edit screen 300. Thus, the user may drop a graphic on to drop zone 312 only to find that drop zone 312 is not related to graphic 302 (which obviously can lead to great frustration).

Figure 9:
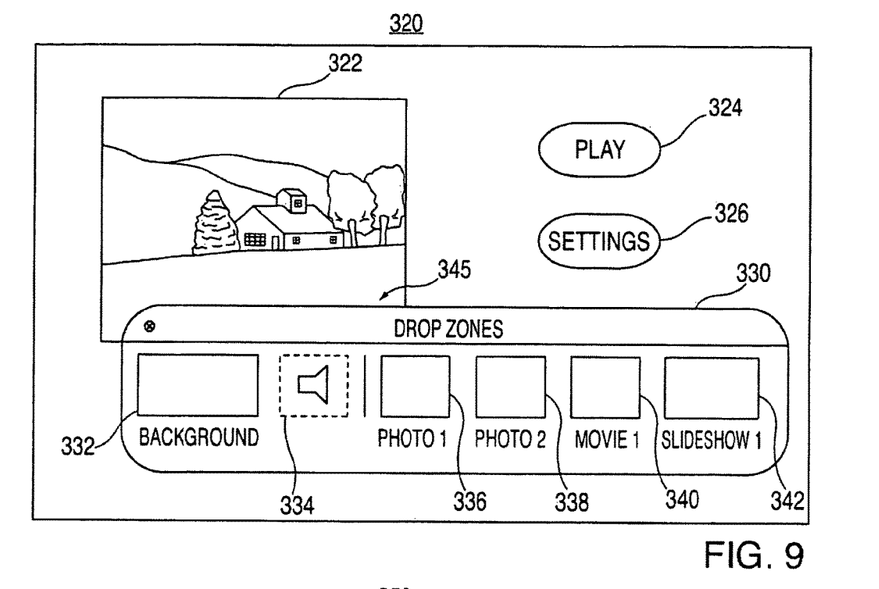
FIG. 9 is a schematic diagram of a conventional method and apparatus that can be used to place various forms of media on a menu screen using a DVD creation program.

In another attempt at providing the user with drop zone capability, the edit screen remained in place and the drop zone was implemented as a floating window or palette, as can be seen edit window 320 in FIG. 9. Edit window 320 can include graphic element 322 (which, similar to graphic element 302, may be a simple digital picture, a slideshow, a movie clip, etc.), function buttons 324 and 326, and floating drop zone window 330. Drop zone window 330 may include a background 332, audio zone 334 and one or more drop zone(s) 336, 338, 340 and 342.

This implementation provided significant improvement over previously known attempts in that the user could immediately see the results of the drop zone selection on the menu screen. This implementation, however, also had its deficiencies. In particular, the use of a floating window necessarily meant that some portion of the edit window was being obscured, such as area 345, which is under the top of the floating window 330. While the user was, of course, free to move the floating window to different locations on the screen at will, the user therefore had to keep track of where the window was and may have had to move it many times during a single editing session. In addition, if the user was utilizing multiple applications, such as an internet browser, the user may also have had to move floating window 330 to keep it clear from the other application windows.

Figure 10:
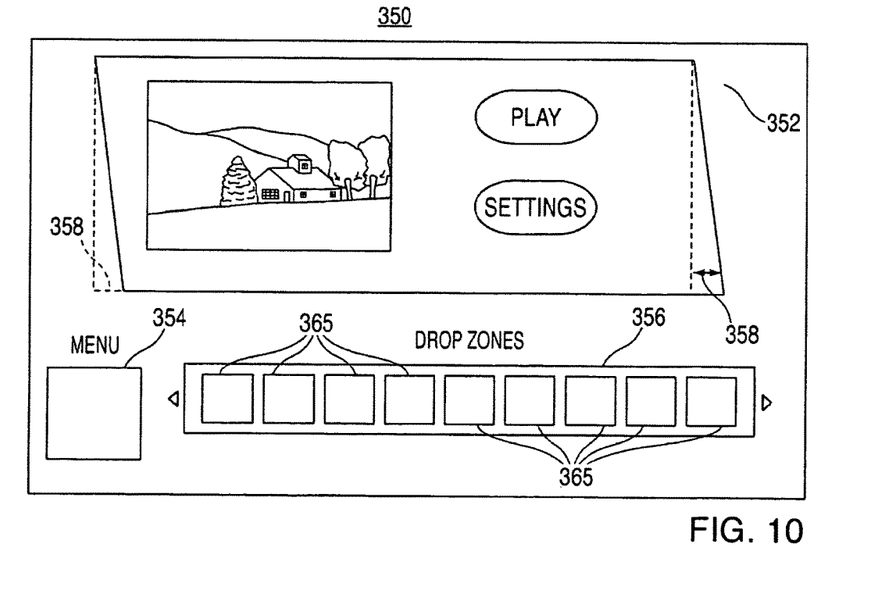
FIG. 10 is a schematic diagram methods and apparatus that can be used to place various forms of media on a menu screen using a DVD creation program in accordance with the principles of the present invention

FIG. 10 shows menu editor 350 which, in accordance with the principles of the present invention, provides the user with a single window in which the content of the DVD menu can be changed, while also providing the user with the ability to vary the content of drop zones in the same window. Menu editor 350 includes menu edit area 352, menu editing button 354 and drop zone edit region 356.

Menu editor 350 operates in two different modes. In its primary mode, menu editing, menu edit area 352 is the primary window that appears on the screen and the drop zone region is not viewable. The user can edit the menu screen at will and receive immediate feedback from the system as to the effect of proposed changes to the menu screen itself (such as, for example, changes to the functional buttons). Selecting drop zone mode (by selecting a menu option, for example, or by clicking on menu block 354), however, causes the primary function of editor 350 to change from the DVD menu to the drop zone editor. That change in mode causes menu edit area 352 to tilt backwards slightly, as indicated by reference 358, which opens up space on the screen for drop zone edit region 356 to come on screen.

Drop zone edit area 356 may include one or more drop zones 365, which are areas in which the user can drag and drop graphic elements in place. One advantage of edit menu screen 350 is that the user can instantly see the impact of any changes to DVD menu screen resulting from the changes to one or more drop zone(s). The number of drop zones 365 available to the user may vary depending on the implementation selected. For example, if the user selects a DVD menu having a single drop zone, then drop zone edit region 356 might only display a single drop zone block 365.

Once the user has completed making changes to the drop zone (at least for the time being), the user would select MENU edit mode, such as by clicking on icon 354, which would cause the drop zone edit area to disappear from the screen while, simultaneously, menu edit area 352 swings back into its full size, straight orientation, position (this movement may also be accompanied by a sound to further alert the user as to which mode he or she is in).

When the user believes that the content for the DVD is complete and ready for production, the user again switches modes and prepares to burn the DVD. Burning a DVD is a relatively complex process that, in essence, needs to be hidden from the user, so that any user, regardless of his or her level of experience, can easily create and produce multimedia devices such as DVDs. In general, there are three significant factors that each have an affect on the others. These factors include: (1) performance—as measured in the time it takes to burn the DVD; (2) capacity—as measured by how much information or data can be stored on the medium; and (3) quality—as measured by the overall quality of the images/videos/etc. that may be observed by viewers of the finished products.

Choosing one factor over the others often results in relatively significant consequences, which need to be conveyed to the user in fair and simple way. For example, if a user favors performance (essentially requesting that the computer burn the DVD as fast as possible), the maximum space on the DVD will be limited and the quality of the output video may not be as good as it possibly could be. If quality is emphasized as the most important factor, however, the user needs to appreciate that it may a significantly longer amount of time to burn the DVD than the user may accustomed to.

Figure 11:
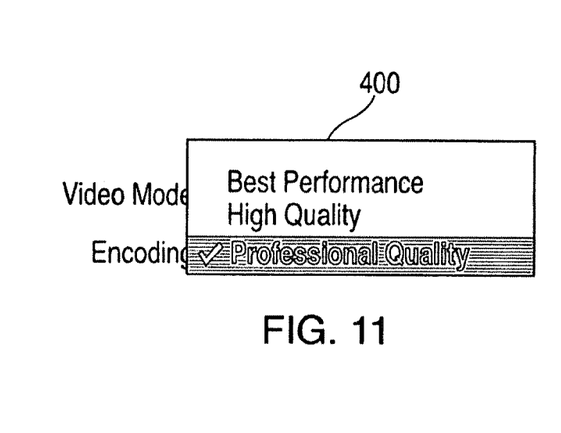
FIG. 11 is a schematic diagram of a user interface menu that can be used in creating DVDs in accordance with the principles of the present invention.

The methods and apparatus of the present invention address these issues by providing an intuitive user interface that provides the user with the ability to select a burning option while communicating to the user the impact of the selection. FIG. 11 shows an illustration of a selection menu 400 that a user can utilize to choose which mode the burner should operate in. As shown in the example of FIG. 11, the user can be given the choice between "Best Performance," "High Quality" and "Professional Quality."

Once the user makes a selection using menu 400, the computer system (such as computer system 100 or computer system 200) then provides the user with an intuitive interface that attempts to quickly and easily explain to the user the impact of that choice. The intuitive user interface includes two primary components: a quality bar and a capacity bar (with some additional information as is explained in more detail below).

Figure 12:
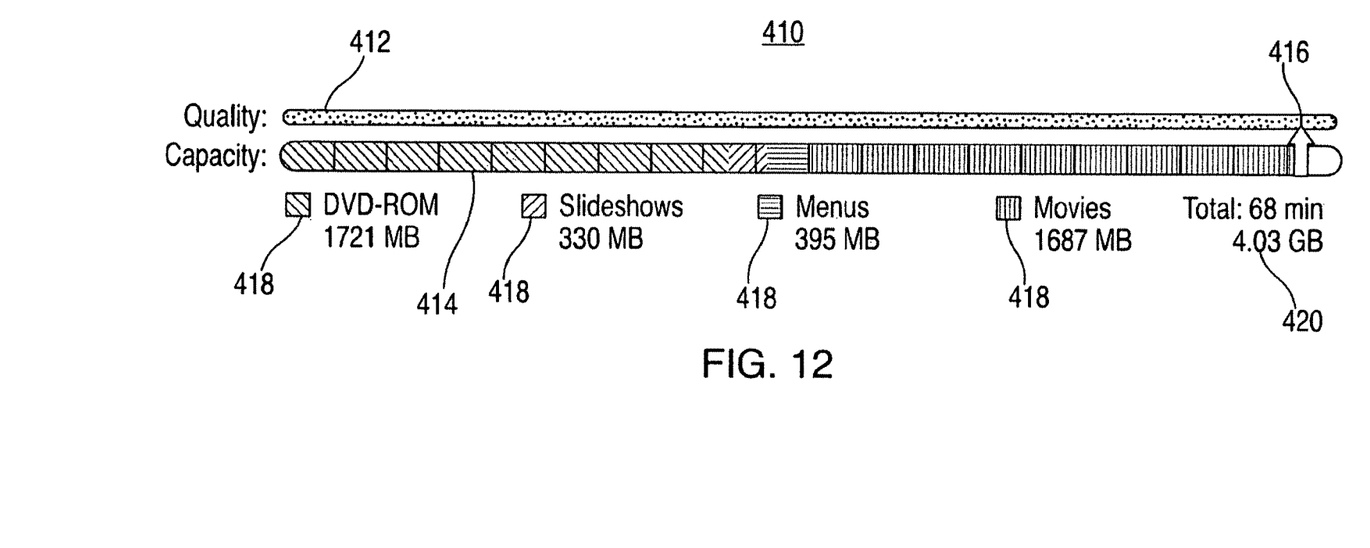
FIG. 12 is a schematic diagram of a user interface display that can be used in creating DVDs in accordance with the principles of the present invention.

FIG. 12 shows one example of user interface 410, which includes quality bar 412, capacity bar 414, space used arrow 416, content information locations 418, and overall DVD information 420. While the user interfaces are shown in the attached drawings to be black and white (and gray), it should be noted that these interfaces are designed in colors which further enhance the user's experience, as is explained below.

Figure 13:
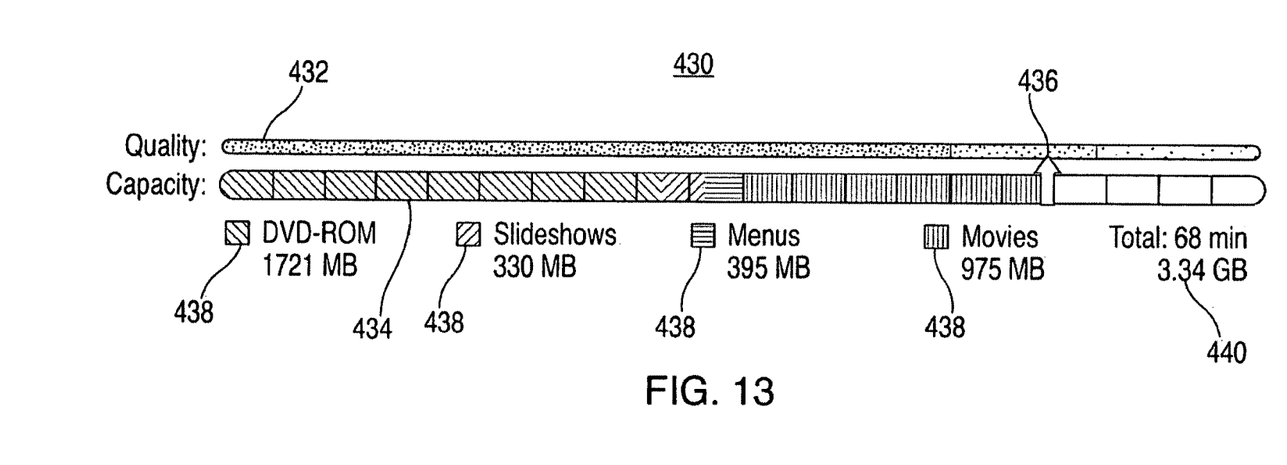
FIG. 13 is a schematic diagram of a user interface display that can be used in creating DVDs in accordance with the principles of the present invention.
Figure 14:
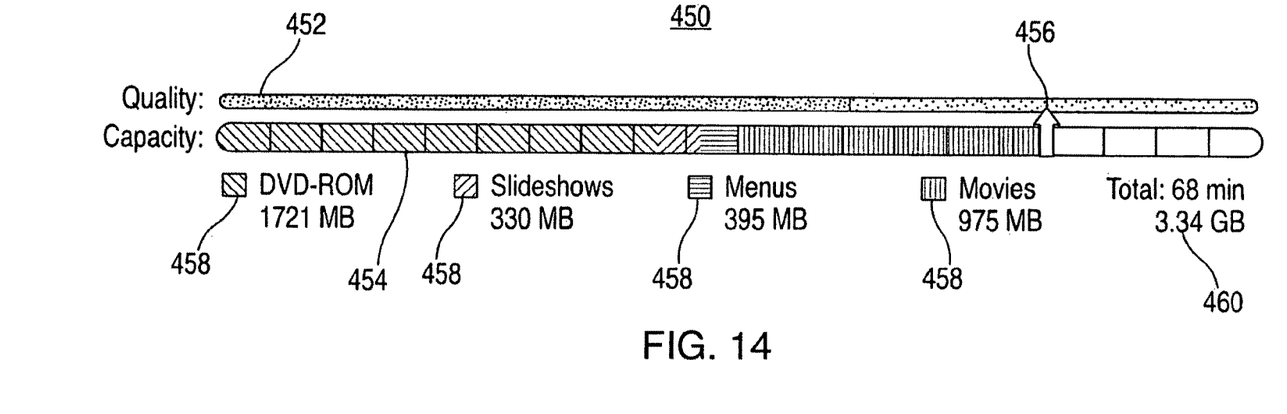
FIG. 14 is a schematic diagram of a user interface display that can be used in creating DVDs in accordance with the principles of the present invention.

As described below, the user interfaces shown in FIGS. 12, 13 and 14 each correspond to the same data and information being configured to be burned on the DVD. The difference in each instance is the option selected by the user on menu 400 for the mode of burning. For example, user interface 410 corresponds to a user selecting "Best Performance" from menu 400, user interface 430 in FIG. 13 corresponds to a user selecting "High Quality," from menu 400, and user interface 450 corresponds to a user selecting "Professional Quality" from menu 400.

The "Quality Bar" in each of user interfaces 410, 430 and 450, is a static graphic element that essentially corresponds to the encoding mode used by computer system 100 (or 200) to burn the DVD as requested. Quality bar 412 is a bar of solid green. In the example shown in FIG. 12, the solid green of quality bar 412 is represented by the pattern of dense dots. The color green can be used to indicate that the recording will be of good quality regardless of how much data or information is burned on to the DVD (within the burning limit of the media). Quality bar 412 is a solid color to indicate that the same type of encoding is accomplished on the entire disk (referred to as constant bitrate encoding). One consequence of making this choice is that the maximum amount of record time on a single DVD is limited to 75 minutes.

Quality bar 432, on the other hand, includes multiple colors that range from solid green on the left side of the bar to red on the right side of the bar (with yellow in the general vicinity of arrow 436). In the example shown in FIG. 13, the solid colors of quality bar 432 are represented as follows: green by the pattern of dense dots, yellow by the pattern of less dense dots and red by the pattern with only a few scattered dots. The change is the result of the burner using a different encoding algorithm—in this instance, a variable bitrate algorithm—to encode the DVD. One positive effect of selecting this mode is that more information can be stored on the DVD since it is not encoding every bit of information the same way (note that DVD information block 440 shows that only 3.34 GB of space on the DVD is used versus the 4.03 GB of space shown by DVD information block 420, even though the exact same information was burned on to the DVD in each case).

Quality bar 452, like quality bar 432, includes multiple colors, however, bar 452 ranges from solid green on the left side of the bar to yellow on the right side of the bar. In the example shown in FIG. 14, the solid colors of quality bar 432 are represented as follows: green by the pattern of dense dots and yellow by the pattern of less dense dots. The change as compared to bar 412 is also the result of the burner using a different encoding algorithm—in this instance, a different variable bitrate algorithm—to encode the DVD. This method of burning also receives the positive effect that more information can be stored on the DVD since it is not encoding every bit of information the same way (note that DVD information block 460 also shows that only 3.34 GB of space on the DVD is used versus the 4.03 GB of space shown by DVD information block 420, even though the exact same information was burned on to the DVD in each case). One negative consequence of this mode is the extended period of time that will be required to burn the DVD (which may not be apparent from the user interface). On the other hand, it should also be apparent that the "Professional Quality" mode provides the user with the ability to burn the most data on the DVD without a significant risk of encoding quality loss (as indicated by the fact that the right-most color is yellow versus the red shown with respect to bar 432).

One of the other advantages of the present invention is that the user is provided with these graphic displays prior to the actual burning of the DVD. This gives the user the ability to view the results of each of the three modes in order to make the best selection. For example, by comparing all three of the user interfaces, it becomes apparent that a large portion of the Quality Bar remains green regardless of the burning mode provided that the recording is limited to less than 60 minutes.

In each of the various aspects of the present invention, implementation of these techniques can be effectuated using computer systems such as computer systems 100 and 200. For example, a user could sit down in front of monitor 104 and, using a combination of keyboard 106 and mouse 108, could start an application program to create and produce a DVD. A portion of the application program would load from hard drive 204 into system memory 206, which could then be accessed by processor 202 to run the program. Individual graphic elements could be accessed by the user that are stored on hard drive 204 and/or external drive 214 for use in a multimedia slideshow and/or use as drop zone elements on the DVD menu. Once the user is satisfied with the content of the DVD, the user could place a blank DVD in optical drive 210 and, through menu 400, select a mode for the burning operation. After checking the anticipated results in one or more of user interfaces 410, 430 and 450, the user could then start the actual burning process using the best mode for his or her purpose.

Thus it is seen that methods and apparatus for creating and producing multimedia devices are provided. It is understood that the apparatus and methods shown in the figures discussed above are merely illustrative and that these methods and apparatus may be modified, added or omitted. Those skilled in the art will appreciate that the invention can be practiced by other than the described embodiments, which are presented for purposes of illustration rather than of limitation, and the invention is limited only by the claims which will follow below.

What is claimed is:

1. A method, comprising:
   receiving, by a computing device, multiple forms of media to be integrated into a slide show, wherein the multiple forms of media comprise one or more video files and one or more image files that are each associated with a respective audio track, wherein a first video file of the one or more video files includes a corresponding first audio track and a second video file of the one or more video files includes a corresponding second audio track, wherein the corresponding second audio track is disabled or non-existent;
   receiving, by the computing device, input selecting a background audio track for the slide show; and
   automatically integrating, by the computing device, in response to receiving the multiple forms of media, the video files, the image files, and the background audio track together into the slide show, wherein the background audio track is played during playback of the slide show when the computing device detects that there is no audio signal generated by another audio track in the slide show.

2. The method of claim 1, further comprising:
   retrieving, using a processor, the one or more video files and the one or more image files from one or more storage devices.

3. The method of claim 1, wherein the respective audio tracks of the video files comprise audio captured as part of the generation of the video files.

4. The method of claim 1, further comprising:
   formatting the multiple forms of media in the slide show to be playable by a media player; and
   automatically playing the slide show using the media player.

5. The method of claim 4, wherein automatically playing the slide show comprises:
   displaying a video and playing the respective audio track of the video; and
   in response to the video ending, playing a different audio track than that associated with the video.

6. The method of claim 4, wherein automatically playing the slide show comprises:
   displaying a video; and
   in response to the video ending, ending the slide show.

7. The method of claim 4, wherein automatically playing the slide show comprises:
   playing the respective audio track associated with a video file as the video file plays; and
   in response to the respective video file ending, presenting an image and fading in the background audio track.

8. The method of claim 4, wherein automatically playing the slide show comprises: fading out the background audio track presented with the one or more image files prior to a transition to presenting a video file; and
   in response to the transition to presenting the video file, playing the respective audio track associated with the video file.

9. The method of claim 4, wherein automatically playing the slide show comprises: displaying a text file for a predetermined period of time.

10. The method of claim 1, further comprising:
    defining, using a processor, a period of time that images included in the slide show are presented when the slide show is played.

11. The method of claim 1, further comprising playing the slide show, wherein playing the slide show comprises:
    displaying a first image for the period of time; and
    in response to the period of time elapsing, displaying a second image for the period of time or playing a video file.

12. A system, comprising:
    a hard drive that stores video files having respective audio tracks, image files, and audio files;
    one or more processors; and
    a non-transitory computer program product, stored on a machine-readable medium, comprising instructions operable to cause the processors to:
    retrieve video files, image files, and audio files from the hard drive, wherein a first video file of the video files includes a corresponding first audio track and a second video file of the video files includes a corresponding second audio track, wherein the corresponding second audio track is disabled or non-existent;
    receive input selecting a background audio track; and
    format the video files, image files, audio files, and the background audio track as a slide show that is enabled to be played by a media player, wherein the background audio track is played during playback of the slide show when the system detects that there is no audio signal generated by another audio track in the slide show.

13. The system of claim 12, wherein the media player automatically plays the slide show after formatting of the slide show is completed.

14. A non-transitory computer program product, stored on a machine-readable medium, comprising instructions operable to cause a processor to:
receive multiple forms of media to be integrated into a slide show, wherein the multiple forms of media comprise one or more video files and one or more image files that are each associated with a respective audio track, wherein a first video file of the one or more video files includes a corresponding first audio track and a second video file of the one or more video files includes a corresponding second audio track, wherein the corresponding second audio track is disabled or non-existent;
receive, by the computing device, input selecting a background audio track for the slide show; and
automatically integrate, in response to receiving the multiple forms of media, the video files, image files, and background audio track together into the slide show in a chronological order based on when images and videos were captured, wherein the background audio track is played during playback of the slide show when the computing device detects that there is no audio signal generated by another audio track in the slide show.

15. The computer program product of claim 14, further comprising instructions to:
retrieve, using the processor, the one or more video files and the one or more image files from one or more storage devices.

16. The computer program product of claim 14, further comprising instructions to:
define, using the processor, a period of time that images included in the slide show are displayed when the slide show is played.

17. The computer program product of claim 14, further comprising instructions to:
play the slide show, wherein playing the slide show comprises:
displaying a first image for the period of time; and
in response to the period of time elapsing, displaying a second image for the period of time or playing a video file.

18. The computer program product of claim 14, wherein the instructions to automatically integrate the video and image files together into the slide show further include instructions to format the slide show to be playable by a media player.

19. The computer program product of claim 14, further comprising instructions to: automatically play the slide show using a media player.

* * * * *